F. H. BANBURY.
MACHINE FOR TREATING RUBBER AND OTHER HEAVY PLASTIC MATERIAL.
APPLICATION FILED NOV. 18, 1916.

1,227,522.

Patented May 22, 1917.
4 SHEETS—SHEET 1.

UNITED STATES PATENT OFFICE.

FERNLEY H. BANBURY, OF ANSONIA, CONNECTICUT, ASSIGNOR TO BIRMINGHAM IRON FOUNDRY, OF DERBY, CONNECTICUT, A CORPORATION.

MACHINE FOR TREATING RUBBER AND OTHER HEAVY PLASTIC MATERIAL.

1,227,522.  Specification of Letters Patent.  Patented May 22, 1917.

Application filed November 18, 1916. Serial No. 132,011.

*To all whom it may concern:*

Be it known that I, FERNLEY H. BANBURY, a subject of the King of Great Britain, residing at Ansonia, in the county of New Haven and State of Connecticut, have invented a new and useful Improvement in Machines for Treating Rubber and other Heavy Plastic Material; and I do hereby declare the following, when taken in connection with the accompanying drawings and the characters of reference marked thereon, to be a full, clear, and exact description of the same, and which said drawings constitute part of this application, and represent, in—

Figure 1:
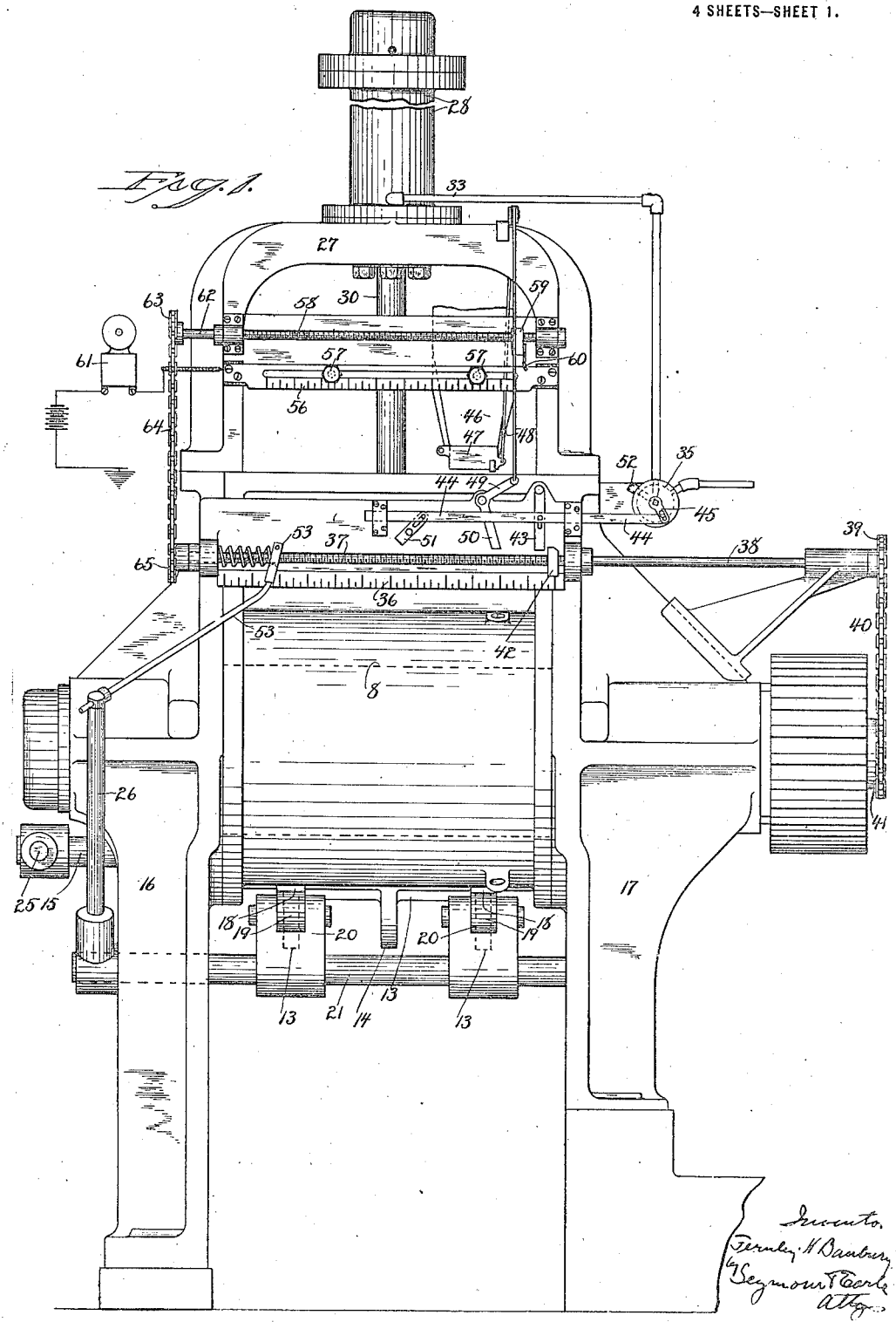

Figure 1 a front view of a machine for treating rubber and other plastic material, constructed in accordance with my invention.

Figure 2:
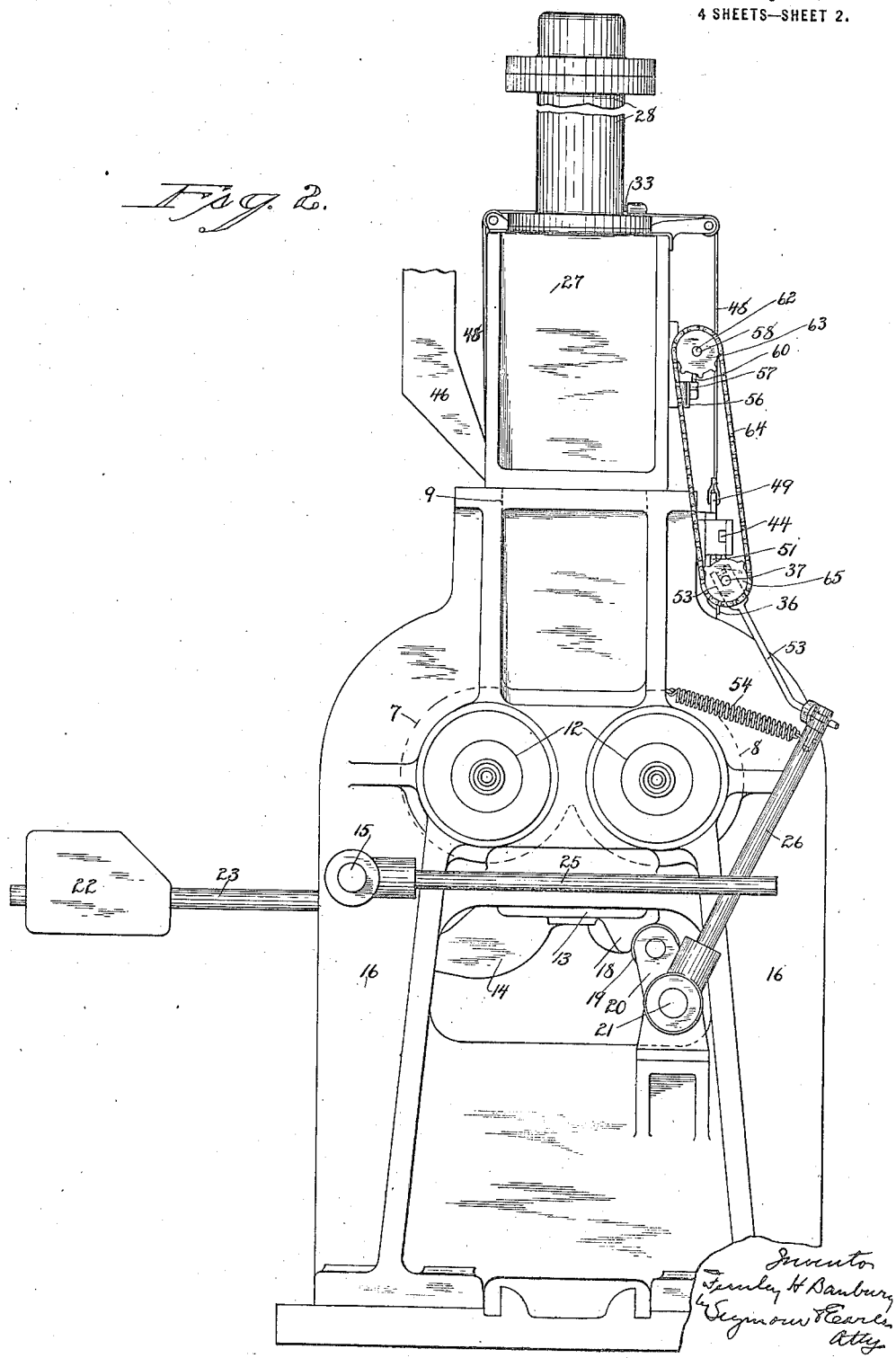

Fig. 2 a side view of the same.

Figure 3:
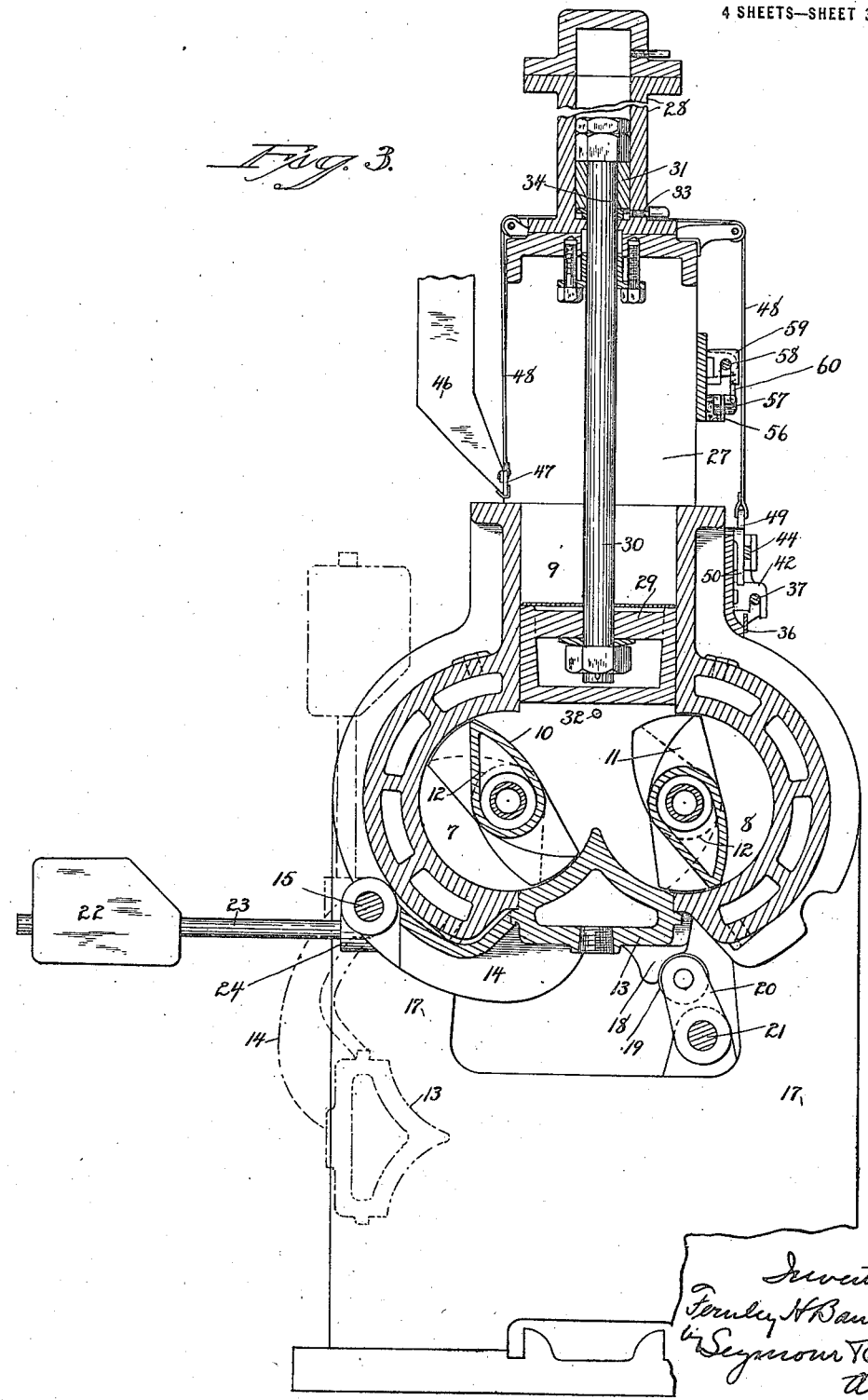

Fig. 3 a vertical sectional view of the same.

Figure 4:
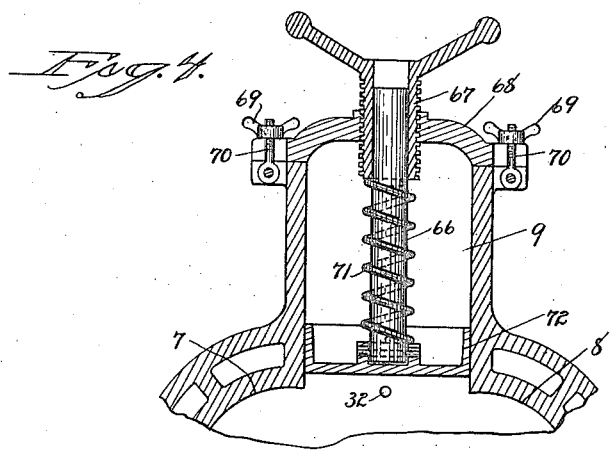

Fig. 4 a broken sectional view illustrating a modified form of weight.

Figure 5:
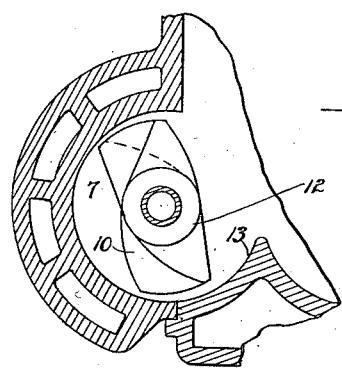

Fig. 5 a sectional view illustrating a modified form of closure for the bottom of the casing.

Figure 6:
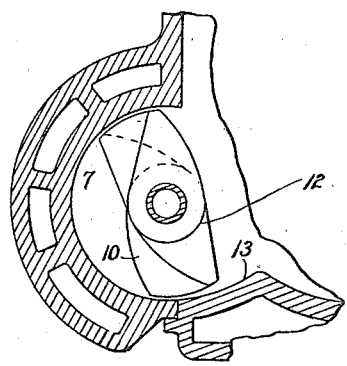

Fig. 6 a broken sectional view illustrating the relation of the blades to the cylinders.

This invention relates to an improvement in machines for treating rubber and other heavy plastic material in which revolving blades act in conjunction with a stationary surface, and is an improvement on the machine shown and described in United States Patent No. 1,200,070, dated October 3rd, 1916.

The object of this invention is to provide means for removing the mixture from the machine and to provide automatic means for controlling the several operations connected therewith; and the invention consists in the construction hereinafter described and particularly recited in the claims.

As in my previous patent, I employ two cylindrical chambers 7 and 8 arranged side by side with their upper parts opening into a communicating chamber 9. Rotors or blades 10 and 11 axially rotate in the chambers 7 and 8 by trunnions 12 working in bearings on the end walls of the chambers. The rotors are provided with blades or wings whose peripheral edges are adjacent the cylindrical walls of the chambers 7 and 8. They are similar in all essential respects and are adapted to rotate and act on rubber or other material placed in the chambers in the opposite directions.

To provide for the removal of the material mixed in the chambers, I provide a door 13 the upper face of which forms a part of the chambers 7 and 8, the walls being segmental and preferably concentric with trunnions or the shafts 12 of the blades 10. This bottom or door is formed integral with a series of arms 14 the outer ends of which are mounted on a shaft 15 which is journaled in the end frames 16 and 17 which form the side supports of the machine. This door is rabbeted to closely fit the opening in the chambers and is provided with locking lugs 18 which, when the door is in the closed position, are engaged by rollers 19 mounted in the upper ends of yokes 20, which yokes are fixed to a shaft 21 also journaled in the frame. The door 13 is counterbalanced by a weight 22 on a rod 23 projecting outward from a hub 24 keyed to the shaft 15, and this shaft 15 may be turned by an operating handle 25. The shaft 21 is provided at its outer end with a lever handle 26. Above the chamber 9 is a bridge 27 supporting a cylinder 28 in line with the chamber 9, and in the chamber 9 is a weight 29 connected with a rod 30 which extends up into the cylinder 28 where it is provided with a piston head 31 which may be moved up and down in the cylinder 28, and this piston-head may be moved by air or water, as will be hereinafter described. The weight 29 is preferably a hollow weight, as shown, so that additional substance may be placed in the weight to increase its pressure on the mixture in the chambers, and its downward movement may be limited by a stop 32. If air or water is used to control the weight, it will be admitted from a pipe 33 through a port 34 at the lower end of the cylinder, and below the piston 31. In this pipe 33 will be a three-way valve 35 by which water or air may be admitted to the cylinder from the source of supply, shut off and allowed to exhaust.

To provide for the automatic action of the machine, an index plate 36 is arranged at a convenient point and parallel therewith is a screw 37 suitably driven from the mechanism used to drive the blades.

As herein shown, the long stem 38 of the screw is provided with a sprocket 39 connected by a sprocket chain 40 with a shaft 41 which drives the blades. On the screw 37 is a split nut 42, and in the path of this nut is a link 43 pivotally connected at its upper end and having operative connection with the actuating rod 44 one end of which is connected with an operating handle 45 of the valve 35. For the addition of powder, I provide a suitable chute 46 into which the powder, such as lampblack, or other suitable material, may be placed. This chute opens into the chamber 9 and is provided with a gate 47 which may be controlled by a cord 48 running over suitable idlers into connection with a bell-crank lever 49, one end 50 of which stands in the path of the nut 42, and so that as the nut moves, it will turn the bell-crank lever and open the gate of the chute. It will be understood that at this time the weight is in the raised position, having been lifted by the movement of the link 43, opening the valve 35 and admitting water or air into the cylinder 38 below the piston 31. As the nut continues its forward movement, it engages with a link 51 also connected with the actuating slide 44 and so as to turn the handle 45 of the valve 35 to allow the air or water to escape through a vent 52 and allow the weight to drop. This weight resting upon the mass in the chambers, forces that mass between the blades and so that the mixing is uniform. As the nut 42 continues to advance, it will strike a yoke 53 which is connected with the handle 26 and so as to move that handle to turn the shaft 21 and disengage the rollers 19 from the lugs 18 and permit the bottom to drop into the position shown in broken lines in Fig. 3, allowing the contents in the cylinder to escape into a suitable receptacle. The door is closed manually by moving the handle 25, and a spring 54 connected with the lever handle 26 and the frame, will return the handle into its locking position, yet yield as the bottom is moved into its closed position. The split nut 42 will be returned to its starting point ready to begin operations when the material is again placed in the chambers. In mixing material, a certain number of revolutions is required to give the plastic material the proper consistency. This varies with different materials; and to notify the operator of a predetermined number of revolutions, I provide a slotted index plate 56 insulated from the bridge 27 and having adjustable contacts 57. On a screw 58 is a nut 59 having a wiping contact 60 which engages with those contacts to close an electric circuit through an audible or visible signal, such, for instance, as an electric bell 61. As herein shown, the screw 58 has a stem 62 carrying a sprocket wheel 63 connected by a sprocket chain 64 with a sprocket 65 on the end of the screw 37, and so that the screw 58 moves in synchronism with the screw 37.

As herein shown, the cylinder and bottom door are chambered to form water jackets, and the blades are also preferably made hollow so that they may be water cooled. Before operations the bottom door 13 is closed and the weight raised. Material to be mixed is then placed in the chamber, the weight is then lowered, and the mechanism started to rotate the blades. After a predetermined number of revolutions, the nut 42 will engage the link 43 and open the valve 35 to admit air or water to the cylinder 28 and lift the piston 31 so as to raise the weight above the lower end of the chute 46 the continued movement of the nut engaging the bell-crank lever 50, opens the chute, and allows powder to enter the chamber. The further movement of the nut strikes the link 51 so as to move the valve 35 to allow the water or air to escape through the vent 52, permitting the weight to drop, the weight then bearing upon the material in the chambers, prevents it from rising or being pushed upward by the blades and causes it to be kneaded, so to speak, by the blades, and a perfect mixture obtained. At a predetermined time the nut 42 strikes the yoke 53 which moves the handle 26 to turn the shaft 21 and move the rollers 19 out of engagement with the lug 18 on the door 13, which swings downward by the force of gravity and allows the contents of the cylinder to be discharged. The operation is repeated by closing the door and again starting the mechanism.

Instead of having the weight shown and described provided with means for raising it by air or water, the weight may be pinned to the lower end of a spindle 66 which projects upward through a hand nut 67 mounted in a bridge 68 connected with the upper end of the chamber 9, being detachably connected thereto by wing nuts 69 on pivotal bolts 70. Between the nut and the weight is a coiled spring 71 which may be adjusted by the movement of the nut 67, and so that instead of using a heavy weight, a light weight or plunger 72 may be employed, and this will be forced downward by the spring 71. It is apparent and as indicated in Fig. 5, that the extent of the upward projection and curvature of the central part of the bottom door 13 may be varied as required, and it is also apparent as indicated in Fig. 6, that the axes of the blades may be eccentric to the central axes of the cylinders, except that they will necessarily closely approach the walls of the cylinders at some point.

The proportion of the communicating chamber 9 with relation to the size of the cylindrical chambers or to the size of the blades, nor the extent of movement of the weight, is not claimed herein, but is made the subject of a separate application filed April 20, 1917, Serial No. 163,419.

I claim:—

1. In a machine of the class described, the combination with a double cylindrical chamber, a weight entering the top of the said chamber, a rotary blade in each side of the chamber, an opening in the bottom of the chamber between the blades, a door adapted to close said opening, and means for holding the door in the closed position.

2. In a machine of the class described, the combination with a double cylindrical chamber, a weight entering the top of the chamber, a rotary blade in each side of the chamber, an opening in the bottom of the chamber between the blades, a door adapted to close said opening, the inner face of the said door formed to conform to the curvature of the said chambers, and means for holding the door in the closed position.

3. In a machine of the class described, comprising a double cylindrical chamber, a rotary blade in each chamber, an opening in the chamber between said blades, a door adapted to close said opening, said door provided with an arm pivoted in position to throw the door into the said opening, a lug on the outer face of the door, a shaft, yokes mounted on said shaft, rollers mounted in said yokes and adapted to co-act with said lugs to lock the door in closed position.

4. In a machine of the class described, comprising a double cylindrical chamber, a rotary blade in each chamber, an opening in the chamber between said blades, a door adapted to close said opening, said door provided with an arm pivoted in position to throw the door into the said opening, a lug on the outer face of the door, a shaft, yokes mounted on said shaft, rollers mounted in said yokes and adapted to co-act with said lugs to lock the door in closed position, and means for turning said shaft.

5. In a machine of the class described, comprising a double cylindrical chamber, a rotary blade in each chamber, an opening in the chamber between said blades, a counterbalanced door adapted to close said opening, said door provided with an arm pivoted in position to throw the door into the said opening, a lug on the outer face of the door, a shaft, yokes mounted on said shaft, rollers mounted in said yokes and adapted to co-act with said lugs to lock the door in closed position.

6. In a machine of the class described, the combination with a two-part chamber, a central opening in the bottom thereof, a door for closing said opening, a shaft upon which said door turns, said door formed with outwardly projecting lugs, a shaft below said door, yokes on said shaft, rollers carried by said yokes and engaging with said lugs for holding the door in a locked position, an operating handle on said shaft, and means for turning said shaft at a predetermined time.

7. In a machine of the class described, the combination with a casing formed in the bottom with an opening, a door to close said opening, means for locking the said door in the closed position, a weight entering said chamber, a spindle connected at its lower end with said weight, a cylinder above the casing into which the spindle projects, a piston on said spindle within said cylinder, means for raising said piston, and means to automatically control the movement of said piston and the movement of said door.

8. In a machine of the class described, the combination with a casing formed in its bottom with an opening, a door adapted to close said opening, means for locking said door in a closed position, a weight entering the top of the said chamber, a spindle with which said weight is connected, a cylinder into which said spindle extends, a piston head on said spindle within said cylinder, a powder chute arranged above the casing, and automatic means for moving the weight, opening the said chute, and opening said door, substantially as described.

9. In a machine of the class described, the combination with the chambers thereof, of rotary blades in said chambers, means for rotating said blades, a signal, and means for actuating said signal after the blades have completed a predetermined number of revolutions.

10. In a machine of the class described, the combination with the chambers thereof, of rotary blades arranged to rotate in said chambers, an opening in the bottom of the chamber between said blades, a door arranged to close said opening, means for locking the door in the closed position, and means to automatically release said door after the blades have made a predetermined number of revolutions.

In testimony whereof, I have signed this specification in the presence of two subscribing witnesses.

FERNLEY H. BANBURY.

Witnesses:
W. B. MARVIN,
D. G. WARNER.